Patented July 22, 1924.

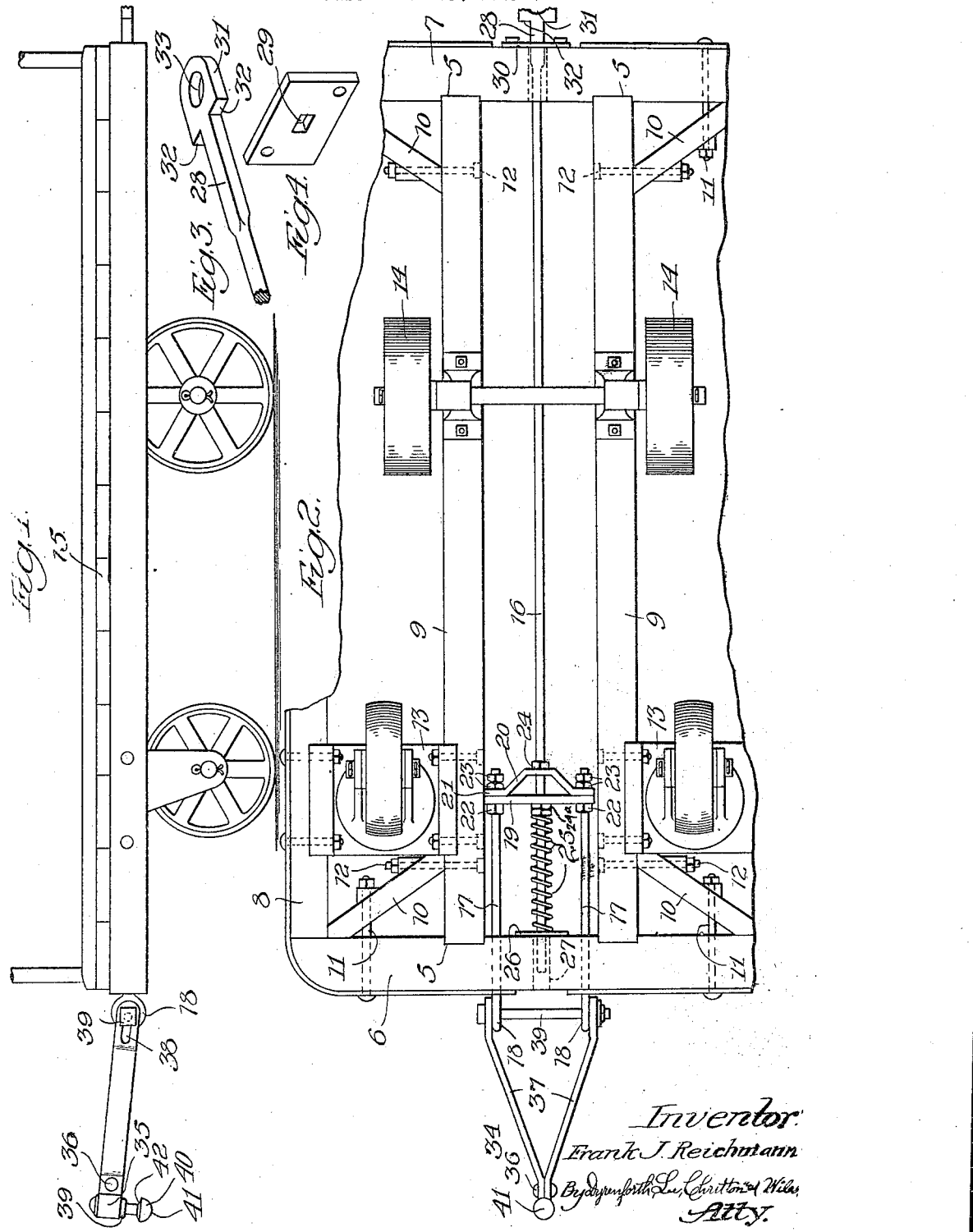

1,502,398

UNITED STATES PATENT OFFICE.

FRANK J. REICHMANN, OF CHICAGO, ILLINOIS.

VEHICLE.

Application filed January 28, 1921. Serial No. 440,627.

*To all whom it may concern:*

Be it known that I, FRANK J. REICHMANN, a citizen of the United States, residing at Chicago, in the county of Cook and State of Illinois, have invented a new and useful Improvement in Vehicles, of which the following is a specification.

My invention relates, more particularly, to improvements in vehicles of the type adapted to be connected together to form trains and more particularly to trucks, commonly designated trailers, adapted to be drawn through the medium of trackless motors.

One of my objects is to provide for the operative connection between vehicles forming a train thereof, by a construction wherein positive draft of the vehicles may be effected without undue stress thereon by reason of the draft, regardless of the number of vehicles constituting the train, and without undue wear on the connections between the vehicles. Another object is to provide coupling means for vehicles of the type referred to which may be readily coupled together and readily uncoupled, even when the vehicles are extending at different angles to the vertical, as for example where one vehicle extends in one plane, as for example in a horizontal plane, and the adjacent vehicle connected therewith extends in another plane to the vertical as for example where it is located on an incline. Another object is to provide coupling means whereby danger of accidental uncoupling is reduced to the minimum, and other objects as will be readily understood from the following:

Referring to the accompanying drawing:

Figure 1 is a view in side elevation of a trailer truck constructed in accordance with my invention. Figure 2 is a broken bottom view of the structure of Fig. 1. Figure 3 is a perspective view of one end of a portion of the draft-rigging; and Figure 4, a perspective view of a plate employed for preventing the element shown in Fig. 3 from rotating.

The truck shown is formed of a framework 5 comprising end sills 6 and 7, side sills 8 (one only of which is shown), and a center sill structure formed of the two parallel members 9 spaced apart and connected with the end sills, the structure also being shown as formed with braces 10 which extend from the inside surfaces of the corners of the frame, in an inclined direction toward the opposite ends, respectively, of the truck and toward the center line thereof, bolts 11 and 12 connecting the braces 10 with the end sills and the center sills. Caster-wheel structures represented at 13 are connected with the side and center sills at one end of the truck and other wheels represented at 14 are mounted at the opposite end of the truck. The framework thus provided is shown as supporting a platform 15 on which the objects to be transported by the truck, are placed.

The draft-rigging for the vehicle comprises a member which extends lengthwise of the vehicle and is adapted to connect at its opposite ends with other vehicles (not shown) in front and behind it respectively, and exert pull on the vehicle on which it is supported, in the normal operation of the vehicle, through the medium of a spring connection therewith. In the arrangement shown the member referred to is formed of a rod 16 extending lengthwise of the vehicle and preferably equidistantly spaced from the center-sill members 9, a pair of rods 17 spaced apart and located between the center-sill members 9, preferably equidistantly, and extending at their outer, eye-equipped ends 18, guidingly through the front end sill 6, a cross-piece 19 through which the rod 16 extends, a yoke-member 20 through the central portion of which the rod 16 extends, and with the ends 21 of the yoke member 20 bearing flatwise against the ends of the cross-piece 19, the inner ends of the rods 17 passing through the ends of the cross-pieces 19 and 20 and rigidly securing these parts together by means of nuts 22 and 23 on these rods, the rod 16 carrying nuts 24 and 24$^a$ rigidly connecting the members 19 and 20 thereto, and a coil spring 25 surrounding the rod 16 and located between the nuts 24$^a$ and the bearing plate 26 on the inner side of the front end sill 6, the latter containing an opening 27 into which the rod 16 extends. The opposite end of the rod 16 is formed with a flattened portion 28 which slides in an opening 29 in a plate 30 secured to the rear end sill 7, the extremity of the rod 16 being formed with a head 31 containing an opening 33 to receive the stud of a coupling member carried by an adjacent vehicle with which it is to be connected, the head 31 presenting shoulders 32 which oppose the outer face of the plate 30.

The parts of the structure described are so proportioned and arranged that in the drafting of the vehicle, as through the medium of the coupler elements represented generally at 34, and hereinafter described, when loaded in accordance with the load for which the truck is designed and traveling under the usual conditions, the draft of the vehicle will be through the medium of the spring 25, the draft force thereby being exerted on the front end sill 6 and affording the advantages due to the employment of a spring 25 through the medium of which the draft is effected. The arrangement, however, is such that should the truck meet with undue resistance in its travel, as for example become interlocked with a post of the building in which it is being operated, and which might result in the impairment of the truck if the force exerted by the draft gear thereon continue to be exerted against the front sill as explained with respect to the normal operation of the truck, the shouldered portions 32 of the rod 16 will engage with the rear end sill 7 before the spring 25 becomes fully compressed, thus subjecting the entire frame of the vehicle to a pushing action, as distinguished from an action tending to pull the truck apart thereby greatly reducing the danger of impairment to the structure.

It may be further stated that in the rounding of curves, especially in the case of trackless trailer-trains, the draft-rigging is subjected to severe jerking in a direction at an angle, often at almost a right angle, to the axis of the rigging which it is the desire to resist to the maximum degree, my construction as described serving to very effectually resist such stresses, with the minimum of material, this being due to the provision of the yoke 20 and rods 17, whereby when forces are exerted, as stated, against the draft-rigging one of the rods 17 will be caused to be placed under tension and the other under compression.

The coupler element 34 presents an embodiment of another phase of my invention, this coupler element being shown as formed of a metal band bent upon itself to form an eye 35 at its outer end adjacent to which it is riveted as indicated at 36 and from which riveted portion its ends flare outwardly to provide the arms 37 which contain elongated slots 38 through which a pivot pin located in the eyes 18, extends, affording a pivotal connection of the coupler element 34 with the bars 17 of the draft-rigging and permitting the coupler element to be rocked upwardly into a position wherein it extends almost vertical in which condition it lowers at its slotted portions 38 and abuts the adjacent outer end of the sill structure 6 thereby holding the coupler element in raised position. The eye 35 of the coupler element is equipped with a stud 39 the lower extremity of which is enlarged to form a head 40, the lower surface of which, represented at 41, is preferably of semi-spherical contour, the curved surface presented describing an arc of not more than 180°. The upper portion of the head 40 presents an annular shoulder 42 concentric with the axis of the stud 39, this upper surface being preferably slightly upwardly tapered as for example as shown, though it is within my invention to make this surface at right angles to the axis of the stud. The stud 39 is provided for insertion into the opening 33 of the draft-rigging of the next adjacent vehicle, the stud 39 extending into a position in the opening 33 wherein its shoulder 42, circular in the form shown, extends below the lower surface of the eye 31 which serves as a keeper, thereby forming an interlock between the stud and eye in either the pulling or pushing of adjacent vehicles and preventing the coupler element from jumping out of interlocking position.

One of my objects, in connection with the formation of a coupler element is to permit it to be readily disengaged from the eye of the adjacent vehicle whether the two vehicles be in the same plane or in planes at an angle to each other, as for example when one vehicle is standing on an incline and the other is in a horizontal plane, and this I accomplish in the coupler shown, inasmuch as the under surface of the head 40 is of such construction, preferably as described, that the coupler element may be withdrawn from the keeper 33 by swinging the coupler element on its pivot, upon shifting the vehicles relative to each other to cause the shoulder portion 42 of the stud to register with the opening 33. By such an arrangement the opening 33 may be made relatively small preferably of such dimensions that only very slight clearance is provided between the wall of the opening 33 and the largest part of the stud that passes therethrough, which is desirable inasmuch as by so constructing the parts, liability of accidental disengagement of the coupler element from the keeper is reduced to the minimum.

The provision of the portion 28 not only serves, in conjunction with the opening 29, to prevent the rod 16 from rotating, but also serves to strengthen this rod at the portion thereof extending beyond the sill 7, which is of great advantage especially in spring-draft rigging as this part of the rod is subjected to relatively great stresses, especially in rounding corners, and by thus forming the rod the requisite strength of structure, with the minimum amount of material employed, is obtained.

While I have illustrated and described a particular construction embodying my invention, I do not wish to be understood as intending to limit it thereto as the same may be variously modified and altered without departing from the spirit of my invention.

What I claim as new and desire to secure by Letters Patent, is:

1. In a vehicle, the combination of its body and draft-rigging thereon comprising a rod extending lengthwise of the vehicle for connection at one end, adjacent one end of the vehicle, with another vehicle and movable lengthwise thereof, a plurality of rods spaced apart and extending lengthwise of the vehicle and movable lengthwise thereof, said last-referred-to rods being provided for connection adjacent the other end of the vehicle carrying them, with another vehicle, a cross-piece connected with said last-referred-to rods and through which said first-referred-to rod extends, a yoke-shaped bar connected at its end portions with the structure formed of said plurality of rods and said cross-piece and through which said first-referred-to rod extends, and a spring through the medium of which draft on said plurality of rods is communicated to the body of the vehicle.

2. In a vehicle, the combination of its body formed with an end sill, and draft-rigging on said body comprising a rod extending lengthwise of the vehicle for connection at one end, adjacent one end of the vehicle, with another vehicle and movable lengthwise thereof, a plurality of rods spaced apart and extending lengthwise of the vehicle and movable lengthwise thereof, said last-referred-to rods being provided for connection adjacent the other end of the vehicle carrying them, with another vehicle, a cross-piece connected with said last-referred-to rods and through which said first-referred-to rod extends, a yoke-shaped bar connected at its end portions with the structure formed of said plurality of rods and said cross-piece and through which said first-referred-to rod extends, and a spring operating against said sill and through the medium of which draft on said member is communicated to the body of the vehicle.

3. In a vehicle, the combination of its body having a front end sill and draft-rigging thereon comprising a member extending lengthwise of the vehicle and movable lengthwise thereof and provided for connection at the ends of the vehicle with other vehicles, a spring operating against the front sill of the vehicle on which it is provided and through the medium of which draft on said member is communicated to said vehicle, and means operating to cause the force exerted by said member on the vehicle carrying it to be exerted against a portion of said vehicle other than said front sill, when undue resistance to the movement of said body is exerted.

4. In a vehicle, the combination of its body having a front and rear end sill and draft-rigging thereon comprising a member extending lengthwise of the vehicle and movable lengthwise thereof and provided for communication at the ends of the vehicle with other vehicles, a spring operating against the front sill of the vehicle on which it is provided and through the medium of which draft on said member is communicated to said vehicle, and means operating to cause the force exerted by said member on the vehicle carrying it to be exerted against the rear end sill of the vehicle carrying it.

5. In a vehicle, the combination of its body having a front and rear end sill and draft-rigging thereon comprising a member extending lengthwise of the vehicle and movable lengthwise thereof and provided for communication at the ends of the vehicle with other vehicles, a spring operating against the front sill of the vehicle on which it is provided and through the medium of which draft on said member is communicated to said vehicle, and means operating to cause the force exerted by said member on the vehicle carrying it to be exerted against a portion of said vehicle other than said front sill, when undue resistance to the movement of said body is exerted, comprising a projection on said member and operating to interlock with the rear end sill.

6. In a vehicle, the combination of its body and draft-rigging thereon comprising a rod extending lengthwise of the vehicle for connection at one end, adjacent one end of the vehicle, with another vehicle and movable lengthwise thereof, a plurality of rods spaced apart and extending lengthwise of the vehicle and movable lengthwise thereof, said last-referred-to rods being provided for connection adjacent the other end of the vehicle carrying them, with another vehicle, a cross member operatively engaging said rod and rods, and a spring through the medium of which draft on said member is communicated to the body of the vehicle, said rod extending beyond the end of said body with its extended end portion of enlarged cross-sectional area.

7. In a vehicle, the combination of its body and draft-rigging thereon comprising a rod extending lengthwise of the vehicle for connection at one end, adjacent one end of the vehicle, with another vehicle and movable lengthwise thereof, a plurality of rods spaced apart and extending lengthwise of the vehicle and movable lengthwise thereof, said last-referred-to rods being provided for connection adjacent the other end of the vehicle carrying them, with another vehicle, a cross member operatively engaging said rod and rods, and a spring through the medium of which draft on said member is communicated to the body of the vehicle, said rod extending beyond the end of said body with its extended end portion of enlarged cross-sectional area and of less thickness vertically than horizontally.

8. In a vehicle, the combination of its body and draft-rigging thereon, comprising a rod extending lengthwise of the vehicle for connection at one end, adjacent one end of the vehicle, with another vehicle, and movable lengthwise thereof, a guide in the end of said body through which said rod extends, the latter being of enlarged cross-sectional area at the portion thereof which extends into said guide, a plurality of rods spaced apart and extending lengthwise of the vehicle and movable lengthwise thereof, said last-referred-to rods being provided for connection adjacent the other end of the vehicle carrying them, with another vehicle, a cross-member operatively connecting said rod and rods, and a spring through the medium of which draft on said member is communicated to the body of the vehicle.

9. In a vehicle, the combination of its body and draft-rigging thereon comprising a rod extending lengthwise of the vehicle for connection at one end, adjacent one end of the vehicle, with another vehicle and movable lengthwise thereof, a plurality of rods spaced apart and extending lengthwise of the vehicle and movable lengthwise thereof, said last-referred-to rods being provided for connection adjacent the other end of the vehicle carrying them, with another vehicle, a cross-member operatively engaging said rod and rods, and a spring through the medium of which draft on said member is communicated to the body of the vehicle.

10. In a vehicle, having a body and draft-rigging thereon comprising a rod portion extending lengthwise of the vehicle for connection at one end, adjacent one end of the vehicle, with another vehicle and movable lengthwise thereof, portions rigid with said rod-portion and extending laterally therefrom in opposite directions, and a plurality of rod-portions spaced apart at opposite sides of the plane in which said first-referred-to rod-portion extends and extending lengthwise of the vehicle and movable lengthwise thereof, said last-named rod-portions being connected at their inner ends with said laterally extending portions and provided for connection at their outer ends with another vehicle.

11. In a vehicle, the combination of a body and draft-rigging thereon comprising a rod movable lengthwise of said body, a spring operatively interposed between said body and rod, said spring directly engaging a stationary part of said body and said body having an opening through which said rod extends outwardly, the outer end of said rod being provided for connection with another vehicle and the portion of said rod adjacent said opening being of enlarged cross-sectional area.

12. In a vehicle, the combination of a body and draft-rigging thereon comprising a rod movable lengthwise of said body, a spring operatively interposed between said body and rod, said spring directly engaging a stationary part of said body, said body having an opening through which said rod extends outwardly, the outer end of said rod being provided for connection with another vehicle, and the portion of said rod adjacent said opening being of enlarged cross-sectional area and of less thickness vertically than horizontally.

13. In a vehicle, the combination of a body and draft-rigging thereon comprising a rod movable lengthwise of said body, said body having an opening through which said rod extends outwardly, the outer end of said rod being provided for connection, with another vehicle, and the portion of said rod adjacent said opening being of enlarged cross-sectional area, and a spring operatively interposed between said body and rod and operating to yieldingly resist the movement of said rod in a direction inwardly in said opening.

14. In a vehicle, the combination of a body and draft-rigging thereon comprising, portions which are located at opposite ends of said body, one of said portions being located at one end of said body for single attachment to another, adjacent, vehicle, and a plurality of said portions being located at the other end of said body for plural connection with another, adjacent vehicle, and a spring through the medium of which draft on said draft-rigging is communicated to the body of the vehicle.

FRANK J. REICHMANN.